No. 760,583. PATENTED MAY 24, 1904.
W. H. TAYLOR.
CHECK FOR SLIDING DOORS.
APPLICATION FILED AUG. 3, 1903.
NO MODEL. 8 SHEETS—SHEET 1.

No. 760,583. PATENTED MAY 24, 1904.
W. H. TAYLOR.
CHECK FOR SLIDING DOORS.
APPLICATION FILED AUG. 3, 1903.
NO MODEL. 8 SHEETS—SHEET 4.

No. 760,583. PATENTED MAY 24, 1904.
W. H. TAYLOR.
CHECK FOR SLIDING DOORS.
APPLICATION FILED AUG. 3, 1903.
NO MODEL. 8 SHEETS—SHEET 5.

WITNESSES
INVENTOR
W. H. Taylor
By H. A. Seymour
Attorney

No. 760,583. PATENTED MAY 24, 1904.
W. H. TAYLOR.
CHECK FOR SLIDING DOORS.
APPLICATION FILED AUG. 3, 1903.
NO MODEL. 8 SHEETS—SHEET 6.
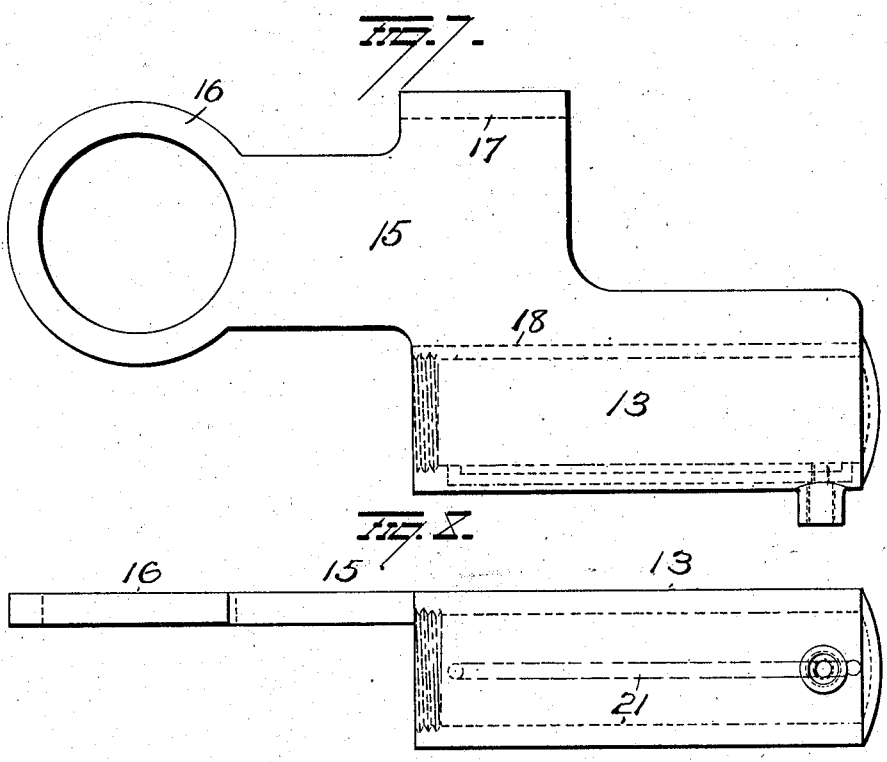
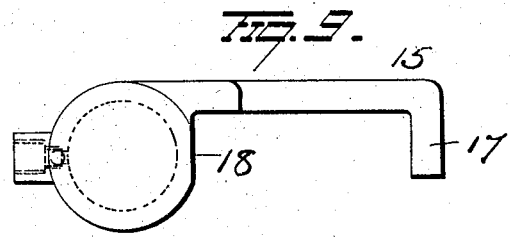
WITNESSES
INVENTOR No. 760,583. PATENTED MAY 24, 1904.
W. H. TAYLOR.
CHECK FOR SLIDING DOORS.
APPLICATION FILED AUG. 3, 1903.
NO MODEL. 8 SHEETS—SHEET 7.
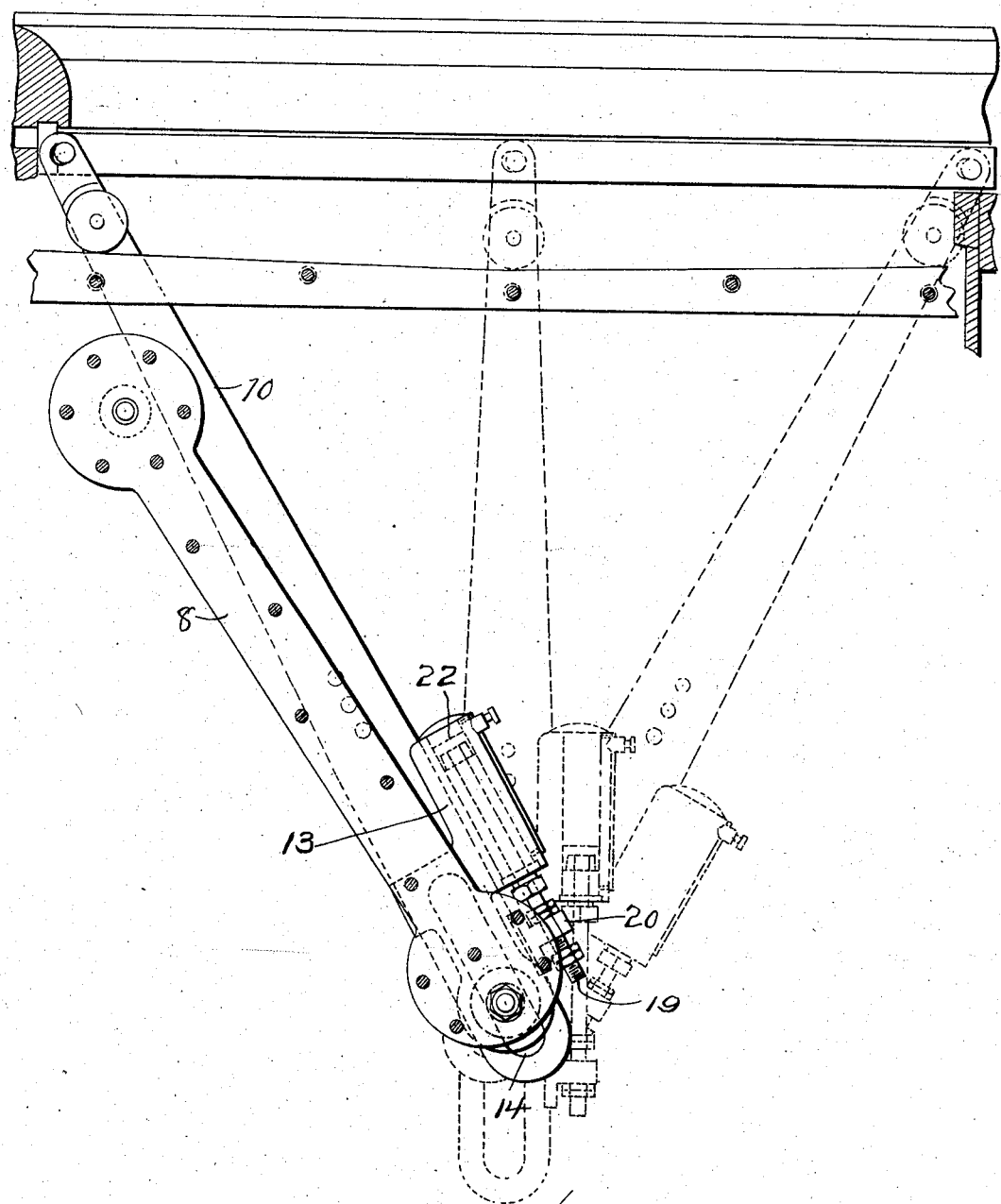

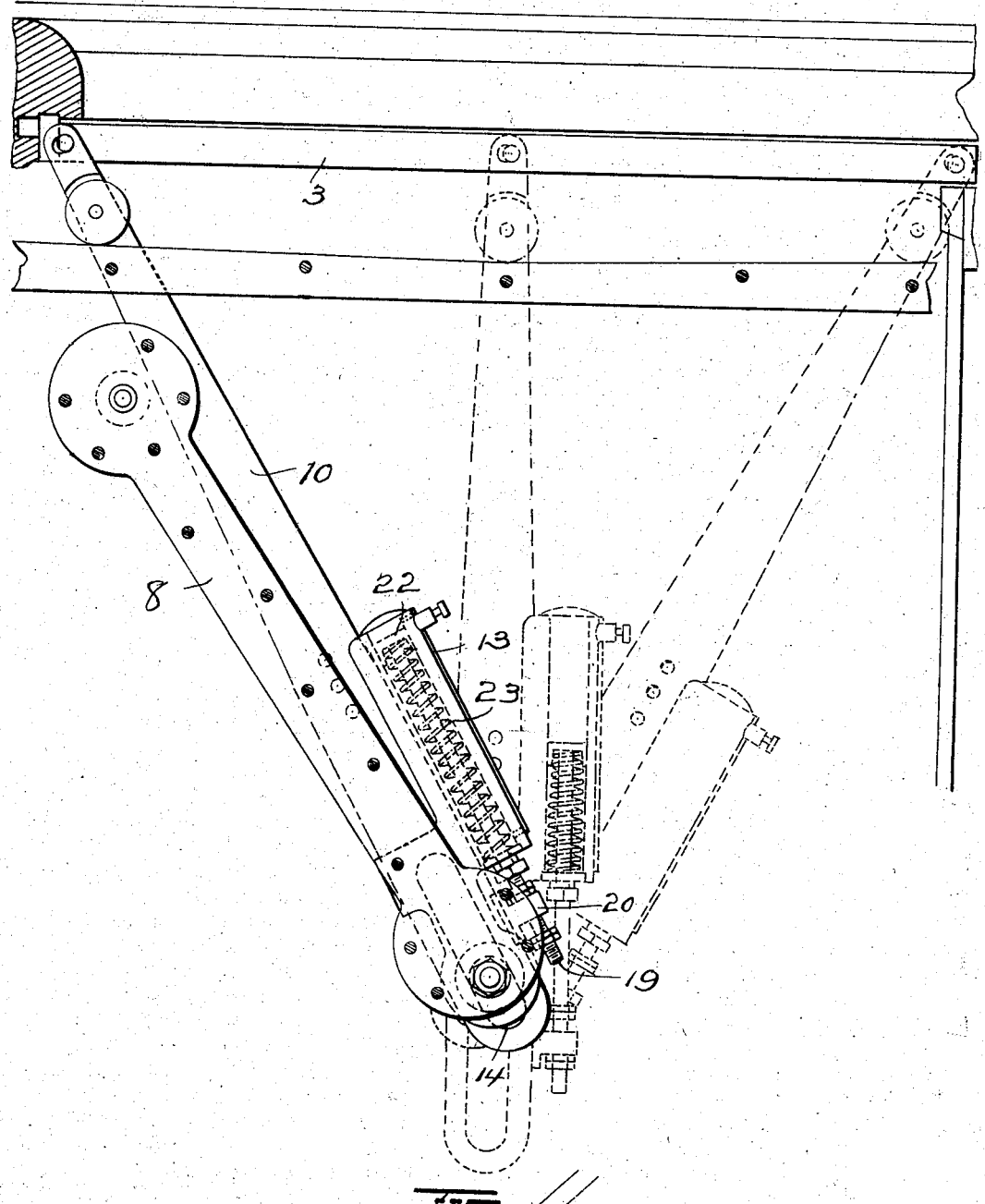

No. 760,583. Patented May 24, 1904.

UNITED STATES PATENT OFFICE.

WARREN H. TAYLOR, OF STAMFORD, CONNECTICUT, ASSIGNOR TO THE YALE & TOWNE MANUFACTURING COMPANY, OF STAMFORD, CONNECTICUT.

CHECK FOR SLIDING DOORS.

SPECIFICATION forming part of Letters Patent No. 760,583, dated May 24, 1904.

Application filed August 3, 1903. Serial No. 168,076. (No model.)

*To all whom it may concern:*

Be it known that I, WARREN H. TAYLOR, of Stamford, in the county of Fairfield and State of Connecticut, have invented certain new and useful Improvements in Checks for Sliding Doors; and I do hereby declare the following to be a full, clear, and exact description of the invention, such as will enable others skilled in the art to which it appertains to make and use the same.

My invention relates to an improvement in checks for sliding doors, and is designed more particularly for use in connection with the sliding doors on cars.

The object of the invention is, broadly, to provide a check connected with the operating mechanism of a sliding door that will check the movements of the door at the end of either its opening and closing movements, or both; and the invention consists in the parts and combinations of parts and details of construction, as will be more fully explained, and pointed out in the claims.

Figure 1:
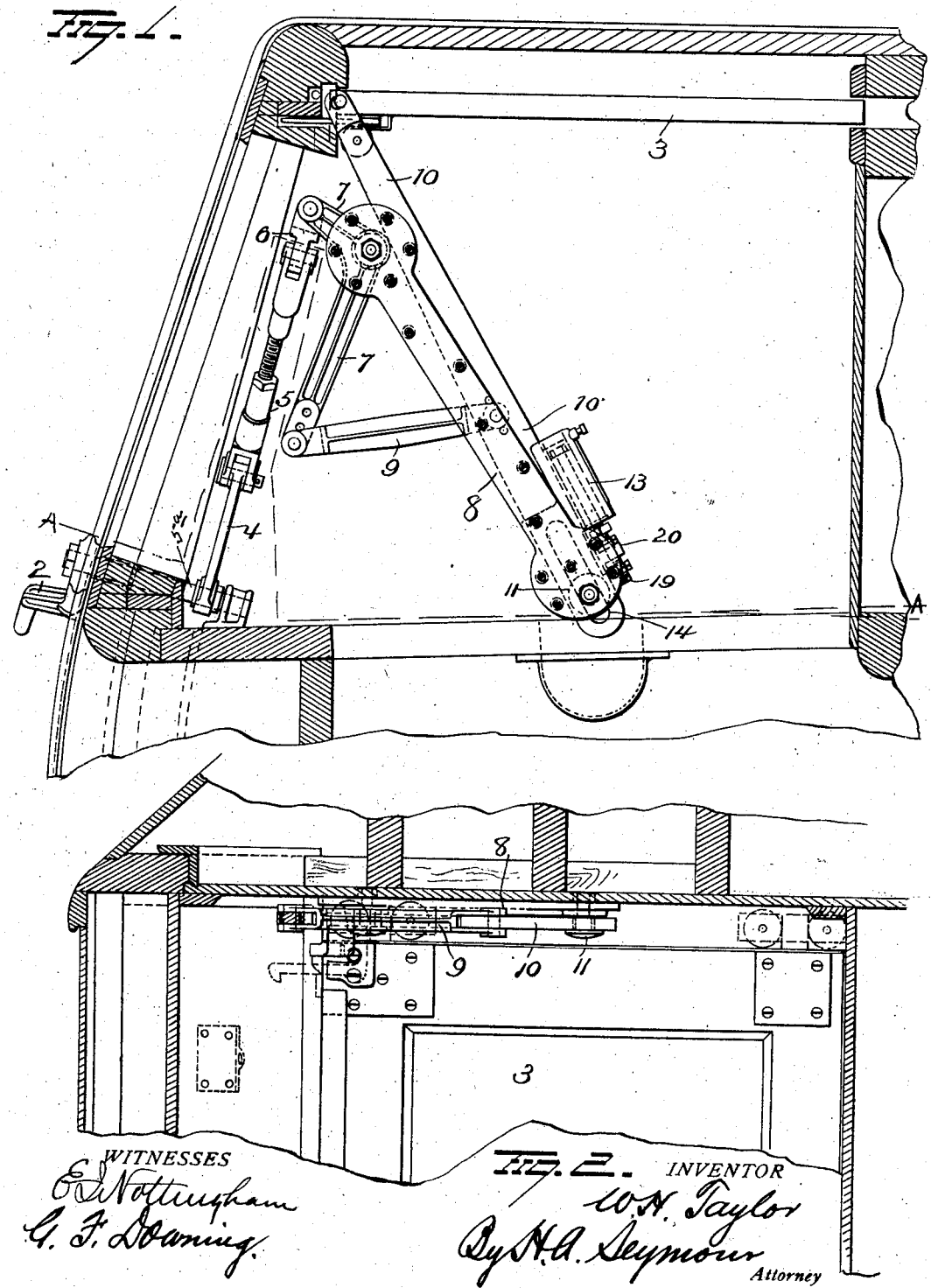
Figure 2:
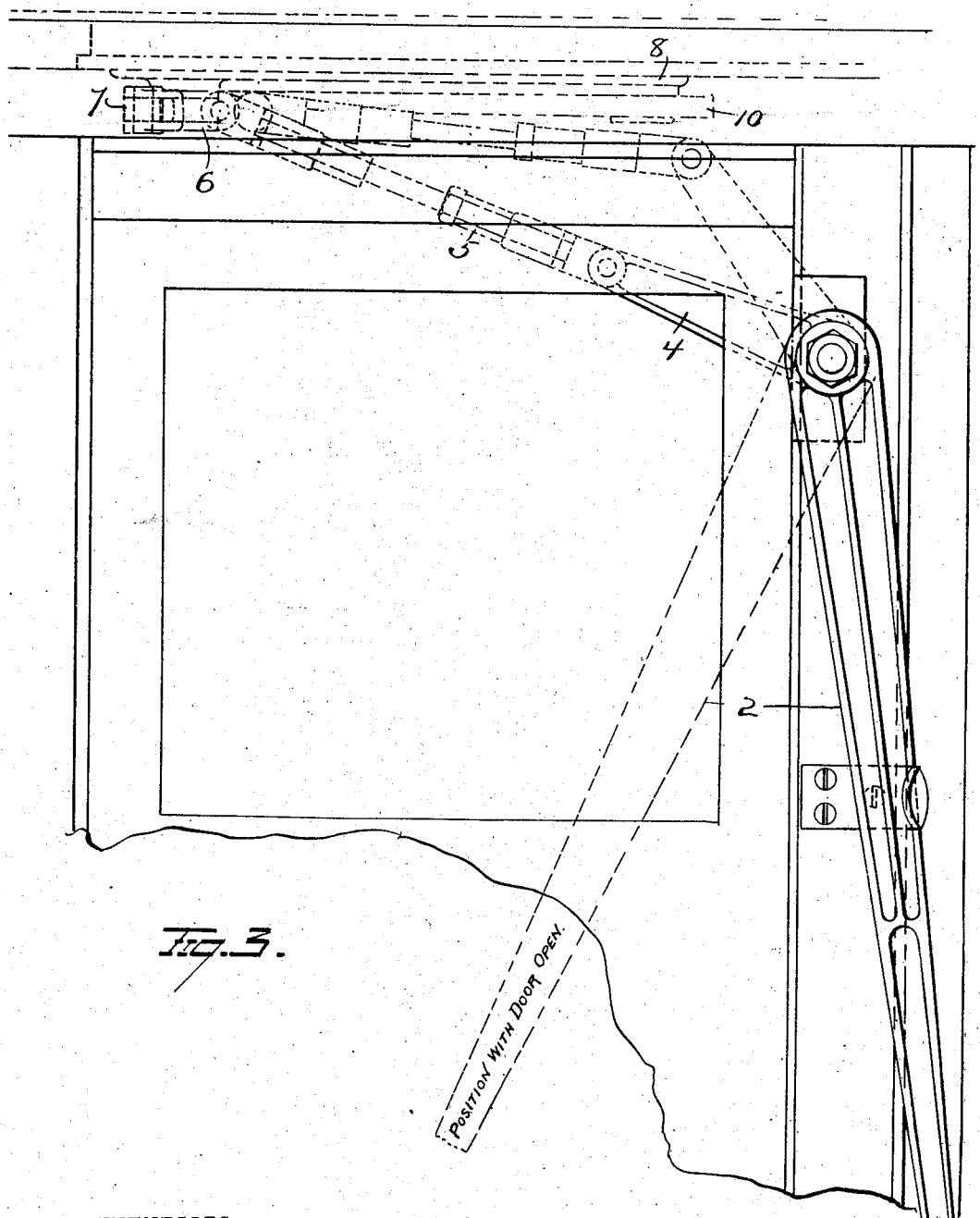
Figure 3:
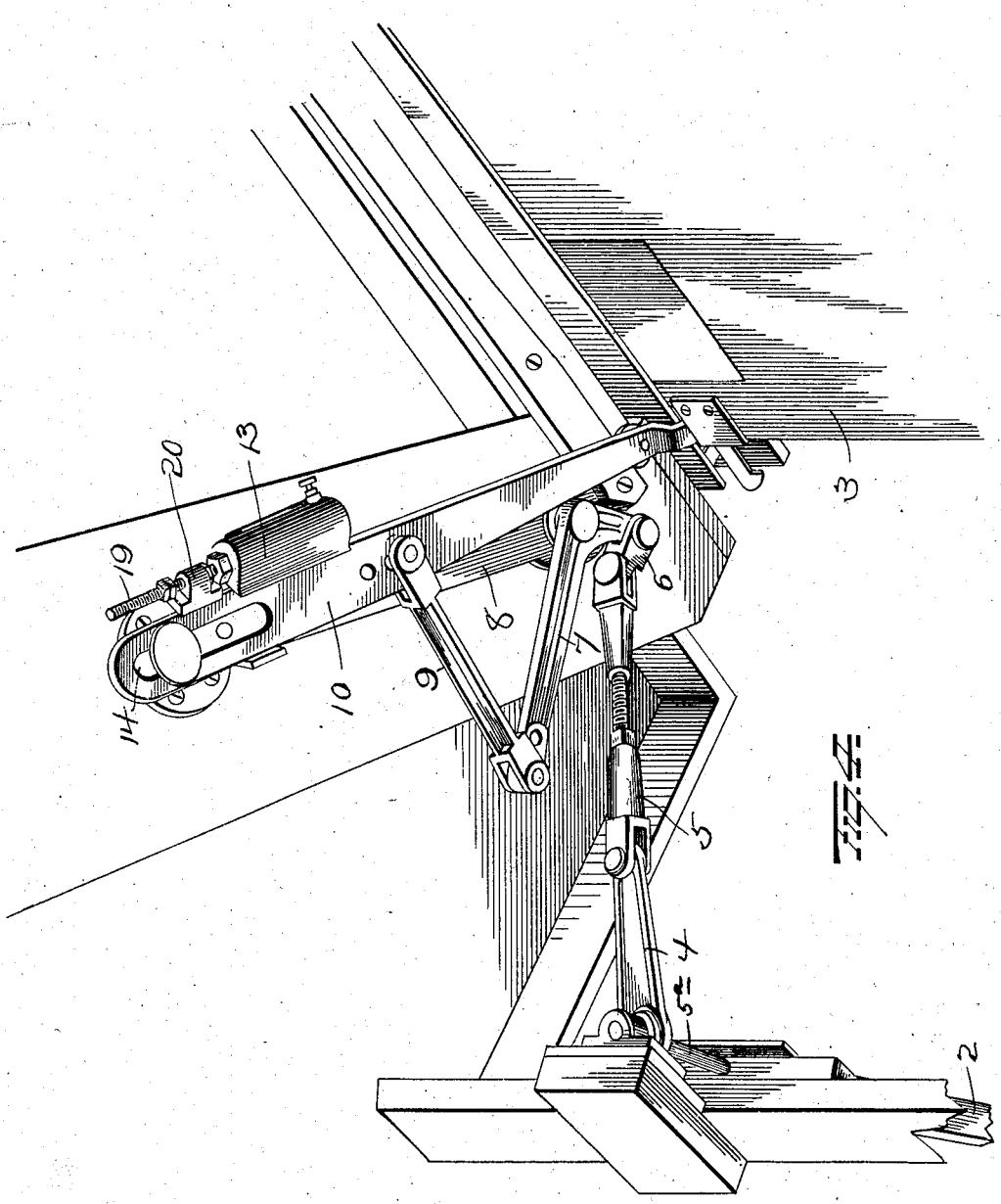
Figure 4:
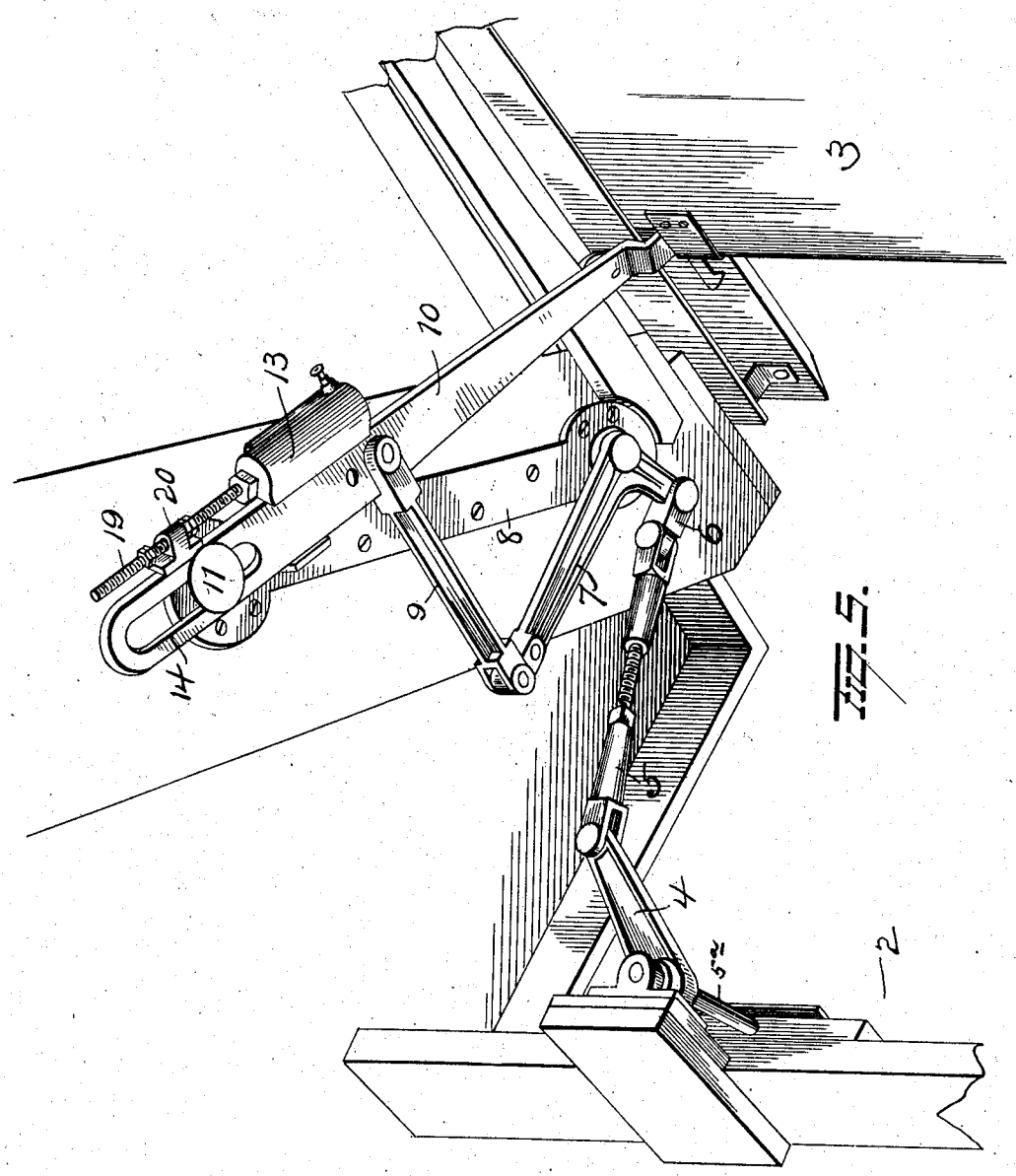
Figure 5:
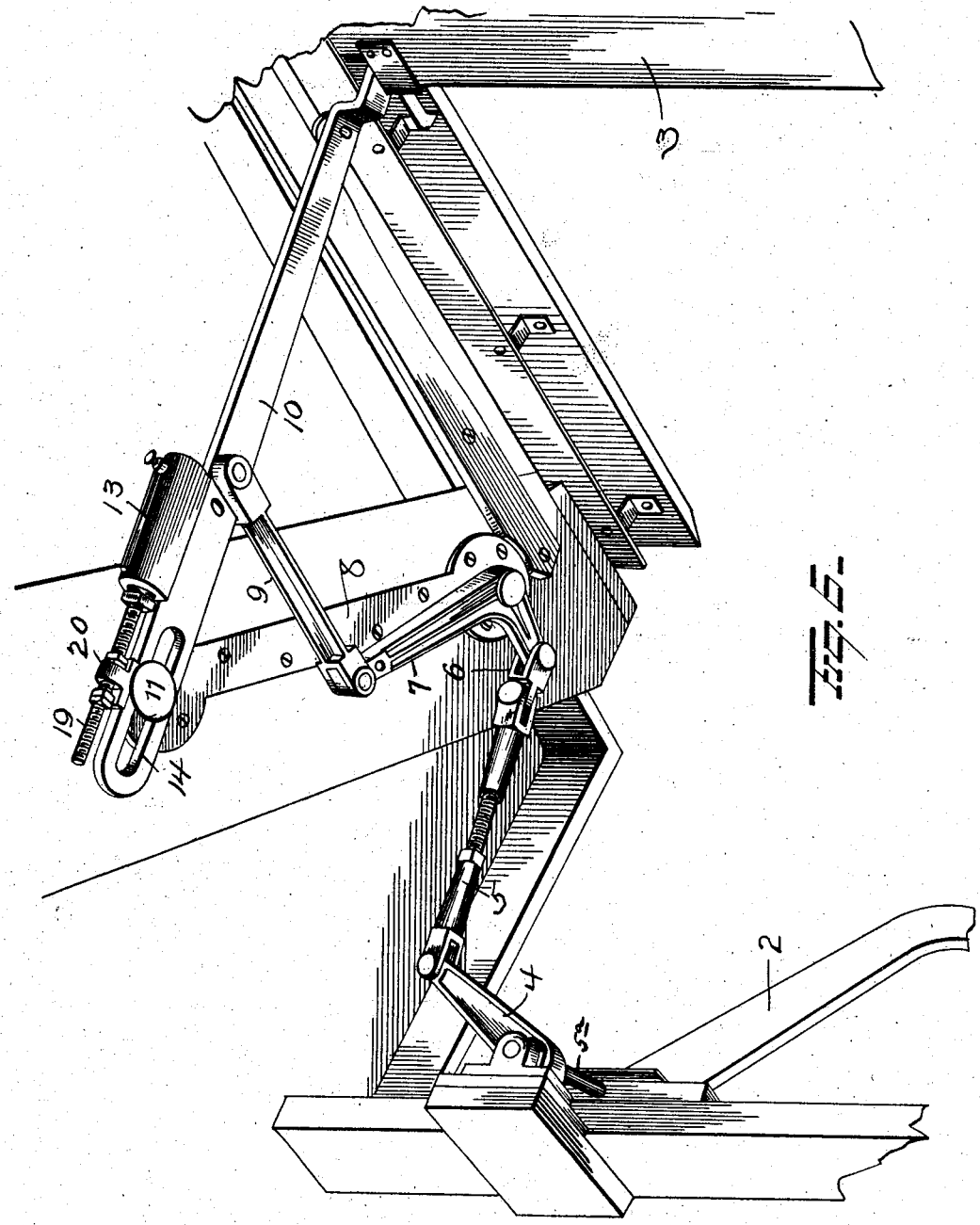

In the accompanying drawings, Figure 1 is a view in elevation of a section of a car with the roof removed, showing my improvements. Fig. 2 is a view in londitudinal vertical section on the line A A of Fig. 1. Fig. 3 is a view in front end elevation of Fig. 1. Fig. 4 is a view in perspective of my mechanism detached, showing it, however, connected to a door, the latter being in a closed position. Fig. 5 is a similar view showing the door about half open. Fig. 6 is a similar view showing the door open. Figs. 7, 8, and 9 are views of the checking-cylinder and its supporting-bracket. Fig. 10 is a view in plan of the door-actuating arm and the check, and Fig. 11 is a similar view showing the check provided with a spring which assists the operator in the final movements of the door both in opening and closing.

In the drawings I have shown the improvements applied to the vestibule 1 of a car, the front of the vestibule being rounded, so that it nearly meets the vestibule of the adjoining car. The gateman or guard stands with a foot on the platform of each car and operates the two depending levers 2, located at the front and outside the vestibules, and these levers in turn each operate a system of levers which act on the sliding door 3 both to open and close it. In the natural hurry of this operation the doors would be slammed both in opening and closing, which would not only cause annoyance from the noise and jar, but would also be destructive to the doors and the car.

This invention is therefore designed (while not preventing the easy operation of the door) to prevent the shock at both ends of its motion, notwithstanding the fact that it had moved rapidly and with considerable force.

From an inspection of Fig. 4 it will be seen that when the door is closed it is held in that position by means of a toggle-joint. This joint (which is on its center when the door is closed) is composed of the lever and pitman 5. Lever 4 is rigidly secured to shaft $5^a$, which also carries the operating-lever 2, while the pitman 5 is pivoted at one end to said lever 4 and at its other end to the link 6, carried by the short arm of the bell-crank lever 7. This lever 7 is pivoted at its angle or elbow to the long plate 8, secured to the ceiling of the vestibule.

When the lower end of lever 2 is pushed outwardly toward the side of the car, the lever 4 will be raised, as shown in Fig. 4, thus carrying the joint connecting lever 4 and pitman 5 above the dead-center and pulling the short arm of bell-crank lever 7 toward the operator, and through the pitman 9 pushing the arm 10, which is pivotally attached to the sliding door, in the direction to open the latter.

The plate 8 is, as before stated, secured to the ceiling of the vestibule, and it carries at one end the pivot on which bell-crank lever 7 is mounted, and at its other end a pintle 11, which supports the inner end of the arm 10 and also the checking-cylinder 13. The arm 10 is provided with an elongated slot 14 for the reception of the pintle 11 and is connected at its other or outer end to the lock-stile side of the door 3 at the upper end of the latter. As the door 3 is a sliding door, it is evident that as arm 10 is rigidly attached thereto, so far as longitudinal movement is concerned, said arm must, when the door is pushed in a direction to either close or open same, be free to move longitudinally, and this longitudinal movement is provided for by the elongated slot 14. Hence both in opening and closing the door there will be a reciprocating movement of the arm 10 relative to the pivot 11, and it is this reciprocating movement of the arm 10 which is taken advantage of and utilized in the application and operation of the checking device. The case of the check, which is shown in Figs. 7, 8, and 9, comprises a cylinder 13 integral with the bracket 15. This bracket is provided at its free end with a hub 16, which is pivotally mounted on elongated plate 8 concentric with the pivot 11, and is provided at its outer edge with a flange 17, the latter, together with the side 18 of the case 13, forming a seat to receive the arm 10. As the cylinder 13 is pivoted on the pivot or pintle 11 and is connected to the arm 10, so as to move therewith, it follows that when the arm 10 is actuated as before explained the cylinder 13 will travel in the arc of a circle with it, but is rigid so far as longitudinal movement is concerned, while the piston-rod 19 of the check, which is connected by bracket 20 to the arm 10, will have a reciprocating or longitudinal movement corresponding to the movements of said arm 10. Hence the reciprocating movement of the arm 10, which occurs both in opening and closing the sliding door 3, will communicate an inward and outward movement of the piston-rod 19 relative to the cylinder 13.

The checking mechanism itself may be of any form desired. In the construction shown in Figs. 7, 8, and 9 I have shown a by-pass 21 connecting the opposite ends of the cylinder 13 with a valve 22 for regulating the passage of liquid through said by-pass. An inspection of the drawings, particularly Fig. 10, discloses that whether the door is being opened or closed the final movement of the piston 22 is always in the same direction, and therefore the checking action, so far as the cylinder is concerned, is only at one end thereof.

In Fig. 10 I have shown the door closed and the piston at the checking end of the cylinder, and when the parts are so located the liquid will be behind the piston. As the door is moved to its half-open position the piston will be moved away from the checking end of the cylinder, the liquid escaping to the checking end of the cylinder through a valved opening in the piston. As the door continues to move from its half-open to an open position the piston then begins to travel toward the checking end of the cylinder and against the liquid confined therein, thus forcing the liquid out through the by-pass 21 to the rear of the piston. As the escape of the liquid from in front of the piston or from the checking end of the cylinder is regulated and controlled by the by-pass 21 and valve 22 therein, the door will complete its opening movement regularly and gently and without noise or jar. As the door is closed the movements are precisely the same, the liquid being forced through the valve in the piston to the rear of the latter until the door is about half closed. The piston then begins to move toward the checking end of the cylinder, its movement being regulated and controlled by the liquid in the checking end of the latter.

In the construction shown in Fig. 11 I have shown a coiled spring 23 within the cylinder 13 behind the piston. This spring in either the opened or closed positions of the door is elongated, and from the operation as above described it will be apparent that during the opening and closing movements of the door the spring will be compressed. Obviously the tendency of the spring is to expand, so that after the arm 10 has passed the center of its movement the expansion of the spring will assist in the operation of forcing the door home to either its closed or opened position and will tend to hold it there against movement from the jar of the train.

While I have shown the spring 23 within the cylinder, it is not essential that it be so located, or indeed located in any special position, it being only necessary that the spring shall be in some way connected with the opening and closing mechanism, so that when the door is opened or closed the spring will assist the movement of the door at the end of its travel.

The mechanism described for opening and closing the door may be varied at pleasure, as my invention consists in the application of a checking device to mechanism for opening and closing a sliding door. It is also evident that various other changes in the construction and arrangement of the various parts may be resorted to without departing from the spirit and scope of my invention. Hence I would have it understood that I do not confine myself to the exact construction shown, but consider myself at liberty to make such changes as fairly fall within the spirit and scope of my invention.

Having fully described my invention, what I claim as new, and desire to secure by Letters Patent, is—

1. The combination with a sliding door and mechanism for opening and closing same, of a check connected to and operated by said opening and closing mechanism.

2. The combination with a sliding door and mechanism for sliding the same, of a check connected to and operated by said mechanism, for checking the final movements of the door either in opening or closing.

3. The combination with a sliding door and lever mechanism connected therewith for moving it to its open and closed position, of a door-check connected to and operated by the movements of said lever mechanism, for checking the final movements of the door either in opening or closing.

4. The combination with a sliding door, of a single door-check indirectly connected to said door for checking its final movements either in opening or closing.

5. The combination with a sliding door and mechanism connected with said door, of a single door-check connected to said mechanism for checking the final movements of the door either in opening or closing.

6. The combination with a sliding door and an arm connected to said door and movable longitudinally as the door is opened and closed, of checking mechanism connected to and actuated by said longitudinally-movable arm for checking the final movements of the door either in opening or closing.

7. The combination with a sliding door, an arm connected thereto and movable longitudinally as the door is opened and closed, and door-actuating mechanism connected to said arm, of a checking device connected to and operated by said arm.

8. The combination with a sliding door, an arm connected to said door and movable longitudinally and door opening and closing devices connected to said arm, of a checking-cylinder free to turn in the arc of a circle and a plunger connected to said movable arm and moving in the cylinder.

9. The combination with a sliding door, an arm connected thereto at one end and slidingly mounted at its other end, and opening and closing devices connected to said arm, of a checking-cylinder mounted to rotate in the arc of a circle, and a checking-plunger connected to the arm and reciprocated by the latter.

10. The combination with a sliding door and mechanism for opening and closing same, of a check connected to and operated by said opening and closing mechanism and a spring for assisting the operator in the final opening and closing movements of the door.

In testimony whereof I have signed this specification in the presence of two subscribing witnesses.

WARREN H. TAYLOR.

Witnesses:
SCHUYLER MERRITT,
DENNIS BURNES.